United States Patent [19]

McCracken

[11] Patent Number: 5,635,912
[45] Date of Patent: Jun. 3, 1997

[54] AUDIO SYSTEM ALARM INTERFACE

[76] Inventor: Michael S. McCracken, 1511 Pear Tree Cir., Brentwood, Tenn. 37027

[21] Appl. No.: 580,398

[22] Filed: Jun. 30, 1995

Related U.S. Application Data

[63] Continuation-in-part of Ser. No. 73,719, Jun. 8, 1993, abandoned.
[51] Int. Cl.⁶ .................................................. G08B 25/08
[52] U.S. Cl. .................. 340/692; 340/426; 340/425.5; 381/84; 381/85; 381/86
[58] Field of Search .................................... 340/692, 384.6, 340/426, 425.5, 460, 521, 902, 326; 395/2; 455/228; 381/84, 86, 51, 85

[56] References Cited

U.S. PATENT DOCUMENTS

| | | |
|---|---|---|
| 4,246,573 | 1/1981 | Kiss ........................................ 340/426 |
| 4,401,971 | 8/1983 | Saito et al. ............................... 340/692 |
| 4,638,293 | 1/1987 | Min ......................................... 340/426 |
| 4,897,630 | 1/1990 | Nykerk .................................... 340/426 |
| 5,117,217 | 5/1992 | Nykerk .................................... 340/426 |
| 5,193,141 | 3/1993 | Zwern ..................................... 340/426 |
| 5,287,333 | 2/1994 | Hirata ..................................... 340/692 |

*Primary Examiner*—Thomas Mullen
*Assistant Examiner*—Benjamin C. Lee
*Attorney, Agent, or Firm*—A. T. Knowles

[57] ABSTRACT

An interface that connects a conventional auto alarm with the audio system of that auto, specifically to the amplifier for the sub-woofer(s), which is connected to low frequency producing speaker(s). Woofer and Sub-woofer bass frequencies are capable of penetrating objects, such as buildings, that high frequency cannot. This sound supplements other alarm signals to increase the chance of alarm status notification. The interface includes a sound generator for producing low frequency signals for output to an external amplifier; an adjustable gain is provided to adjust output levels.

9 Claims, 5 Drawing Sheets

AUDIO SYSTEM ALARM INTERFACE

This invention is a continuation-in-part of Ser. No. 08/073,719, filed Jun. 3, 1993, now abandoned.

BACKGROUND

1. Field of Invention

The present invention relates to alarm systems, and more particularly to an alarm system interface that connects with a high fidelity audio system to provide penetrating bass frequency output. The invention is also related to the general field of products that are designed to get the attention of the hearing impaired. These supplemental bass frequencies can be noticed at times when the high frequency output of an alarm siren is blocked by walls or other obstructions, and can be felt or heard by those whose hearing does not register higher frequency sounds.

2. Description of Prior Art

Alarm systems are known in the art as are audio systems. A typical alarm system is installed for the purpose of securing a defined area from unauthorized intrusion or trespass. The area that is secured will usually comprise a closed area, such as a specified room within a building, or an entire building or house. In the case of automobile alarm systems the secured area protected typically comprises the interior of the automobile but may also extend to unauthorized tampering with the exterior of the automobile.

High fidelity stereo systems and components are known in the art. A typical automobile audio system will comprise a head unit which is the in dash tape deck or Compact disk or radio or all three in one. In any case the audio system sends a signal to an amplifier and then sends a amplified signal to the speakers. In fact, High Fidelity stereo speakers can create so much bass that some states have enacted laws to govern how loud these audio systems can be played. See:

"Shake, Rattle And Roar; Thunder In The Distance? No, It's A 'Boom Car' Coming." (Cars with huge stereo systems). *Time*, Mar. 6, 1989 v133 p52(1).

"Muffling The Boom Cars."(states ban car stereos that can be heard more than 50 feet away). *Time*, Jan. 29, 1990 v135 p63(1).

Many home and automobile alarms rely on high frequency exterior sirens to alert others of an alarm condition. However, by comparison, no known alarm system uses low bass frequencies to alert others to an alarm condition. While high frequency sounds are muffled or stopped by objects and walls, low frequency sounds consist of a more penetrating energy and can continue audibly through walls and buildings.

There have been several devices designed to get the attention of the hearing impaired in situations where a person of normal hearing abilities would be alerted by the sound of an audible alarm. Some examples are wrist bands that vibrate like a beeper/pager. Others are lights that flash or bed vibrators. All of these "attention getters" can be connected to a phone/fax, fire alarm, or door bell so that they will be activated by these devices. The current invention and preferred embodiment does the same, with the exception that it uses the bass producing ability of a hi-fidelity home or auto stereo system to gain attention. Hearing impaired persons often have the unique ability to "feel" or "sense" pressure waves or bass waves almost like a fifth sense. This is especially true when that individual is also blind. Over time this sensitivity can become highly developed.

Alarm systems known in the art do many things including the use of motion sensors that sense when a person penetrates an invisible barrier. The motion sensors in these systems may trigger either an exterior horn or a voice synthesizer to warn away intruders through exterior speakers. U.S. Pat. No. 5,117,217, *Nykerk:* issued May 26, 1992 discloses an alarm system which remotely senses the presence of a person in the proximity of the protected vehicle and issues an audible warning to move away. This disclosure includes the use of audio speakers to notify the alarm owner if any intrusions were made but says nothing of using bass speakers for audible notification of the alarm being tripped. No prior art has been found that includes an alarm system performing the functions of the present invention.

SUMMARY OF THE INVENTION

Bass sound waves are known to shake or rattle via sound pressure waves and Sound Pressure Level (SPL) windows, picture frames and other objects. This is especially true when large subwoofers and high power amplifiers are involved. In most instances, depending on subwoofer enclosure design, the result is high SPL bass. This bass can penetrate objects like walls, doors and floor levels with a lower loss of sound/pressure energy than any other sound frequency can. An example of bass energy would be a door closing abruptly on a lower or upper floor some thirty or forty feet away through walls. This low bass sound is almost felt more than heard, if not equal in "sense", even for those who can hear.

The current invention acts as an interface between an external activation source (such as an alarm system, computer modem, or fax) and the subwoofer components of a home or auto audio system. This invention, when activated by the external source, can signal activation to both those with normal and impaired hearing when they are located anywhere the bass SPL is high enough to hear, or in the case of the hearing impaired to feel, the bass sounds being generated. Although the preferred embodiment disclosed herein is intended for use in an automobile, this should not preclude its use in other vehicles or buildings.

Many automobile alarm owners are forced every day to park their vehicles in remote locations that do not allow them to hear their high frequency alarm siren. These owners rely on the alarm siren to scare thieves and intruders away; such owners are frequently disappointed. When confronted with such an alarm, an intruder just has to work faster. Many thieves are familiar with the audio components they set out to steal. They also know that bass sound waves have a greater ability to penetrate buildings and in many instances can be heard at great distances.

Upon setting off an alarm that is equipped with the interface of the present invention, a thief will hear both the alarm siren and the bass from the audio speakers. The owner of such an alarm has an increased chance of hearing an alarm condition when inside a building that is located within the range of his or her stereo's bass producing capability. This extra dimension of sound will be noticed by the thief. This will likely make the thief think twice and influence the intruder to flee immediately due to the increased attention brought on by bass flooding through any building located nearby.

The bass carrying range will vary according to each audio system's abilities for bass reproduction. While a stock audio system will have a short range, a multiple amplified, multiple sub-woofer system can create enough bass to shake objects on the walls of buildings and can be heard at great distances.

Every application of an alarm system is somewhat unique, just as every make and model of automobile is somewhat different. Every owner of an alarm system is also different and has needs that change as a function of time and situation. Therefore, each owner must shop around and find an alarm that suits their particular needs. This is expensive and involves installation of a new and different alarm with all of the features that the owner wants. Many alarm owners currently have all of the features that they want and will only want the addition of the present invention's interface between their alarm and audio systems. This interface can be added to any automobile, home or boat that already includes an alarm and an audio system, preferably a high fidelity sound system with separate amplifiers and sub-woofers.

OBJECTS AND ADVANTAGES

Bass sound waves are less impeded by structures which typically deflect high frequency sound waves. Low frequency sound waves curve and bend around corners of buildings and other obstacles; high frequency waves, by their very nature, are prone to poor distribution in places like parking lots, where neighboring cars muffle the sounds. Moreover, bass sounds waves penetrate even the thickest of walls with high efficiency; on the contrary, high frequency sounds waves are virtually if not completely inaudible within buildings. Thus, this interface or alarm substantially increases the efficiency of the alarm's attention getting ability and broadens the scope of the alarm's effective range, simply by virtue of the physics of sound. This alarm system/audio system interface will advantageously give the alarm owner a farther reaching alarm status notification ability and security. Also, the novelty of arming the alarm and hearing the conventional alarm "churp" followed by a thunderous sub-woofer "Boom" created by the present invention's sound generator will appeal to many alarm owners.

The current invention can advise the hearing impaired of an event without the need to wear any device, see anything or be physically close to a mechanical vibrator device. All that is needed for this interface to operate is a trigger device (fax, fire alarm, etc.) and an audio system capable of producing a sufficient amount of bass to be felt by that impaired individual. The majority of hearing impaired people live with others who can hear and those who would have a "normal" use for a hi-fidelity stereo system. Note: Just as people are different, so are their needs and abilities. This is also true for subwoofer enclosures, amplifiers and hardware. Obviously one 10 inch subwoofer with 25 watts is going to be much less powerful than two or four 18 inch subs with 350 or 1000 watts. This is not to say that this low power ten inch woofer could not produce bass that could be felt as well as heard.

Accordingly, several objects and advantages of the present invention include, but are not limited to:

1) To provide an alarm system with increased notification range through the use of low frequency output to an audio system.

2) To provide an interface between existing alarm system and audio components that will generate predetermined audio output to the audio components when an alarm condition is sensed, thus increasing the chance of an intruder abandoning a break in attempt.

3) To provide owner with an audible status indicating bass tone or "blurp" upon arming or disarming alarm to indicate alarms operational status.

4) To provide a reliable interface to audio components that will not interfere with normal use of the audio equipment, such as creating unwanted system noise.

5) To provide an adjustable gain or volume so that the alarm or interface will be compatible with all audio systems.

6) To provide a unit that is easy to install and use.

7) To provide an interface between an external activation source and audio components that will generate predetermined audio output to the audio components when an activation signal is received, and subsequently generate sound waves that can be sensed by the hearing impaired.

Further objects, features and advantages of the present invention will become apparent upon reading and understanding this specification, taken in conjunction with the accompanying drawings.

DETAILED DESCRIPTION OF THE DRAWINGS

Figure 1:
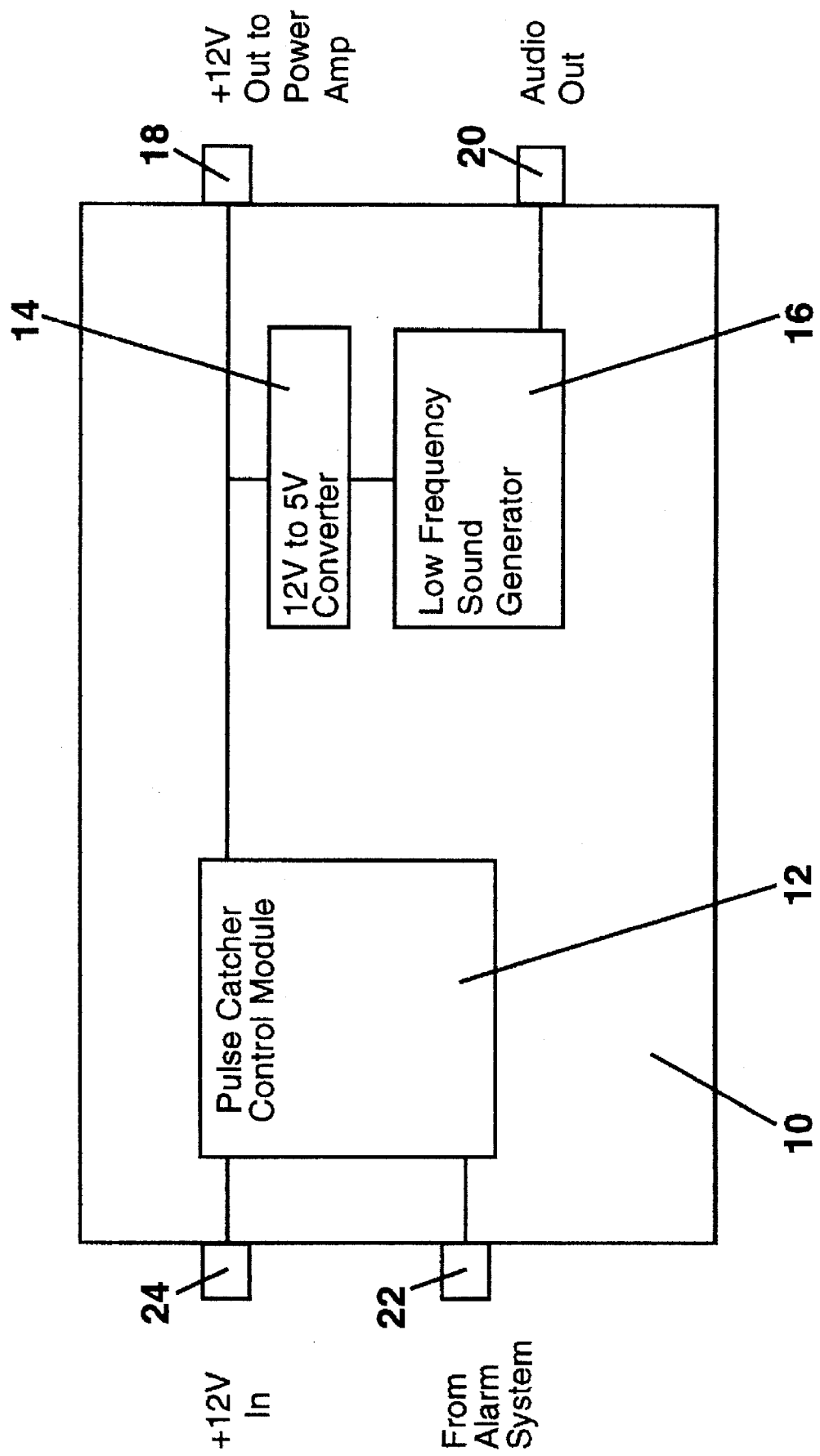
FIG. 1 is a block diagram of the interface unit of the preferred embodiment of the present invention.

Referring now in greater detail to the drawings, in which like numerals refer to like components throughout the several views, FIG. 1 depicts an Audio System Alarm Interface 10, configured in accordance with the preferred embodiment of the present invention as including: a power input connector 24 and alarm input connector 22, which are attached to a pulse catcher 12. The pulse catcher 12 is attached to voltage converter unit 14 and power output connector 18. The voltage converter unit 14 is also attached to a sound generator 16 which is attached to audio output connector 20. Pulse catcher 12 operates to convert signals from alarm input 22 to a 12 volt DC signal which activates both the external audio system through power output connector 18 and sound generator 16 via voltage converter 14. The preferred embodiment also includes a volume or gain control (not shown) connected between sound generator 16 and audio output connector 20.

Figure 3:
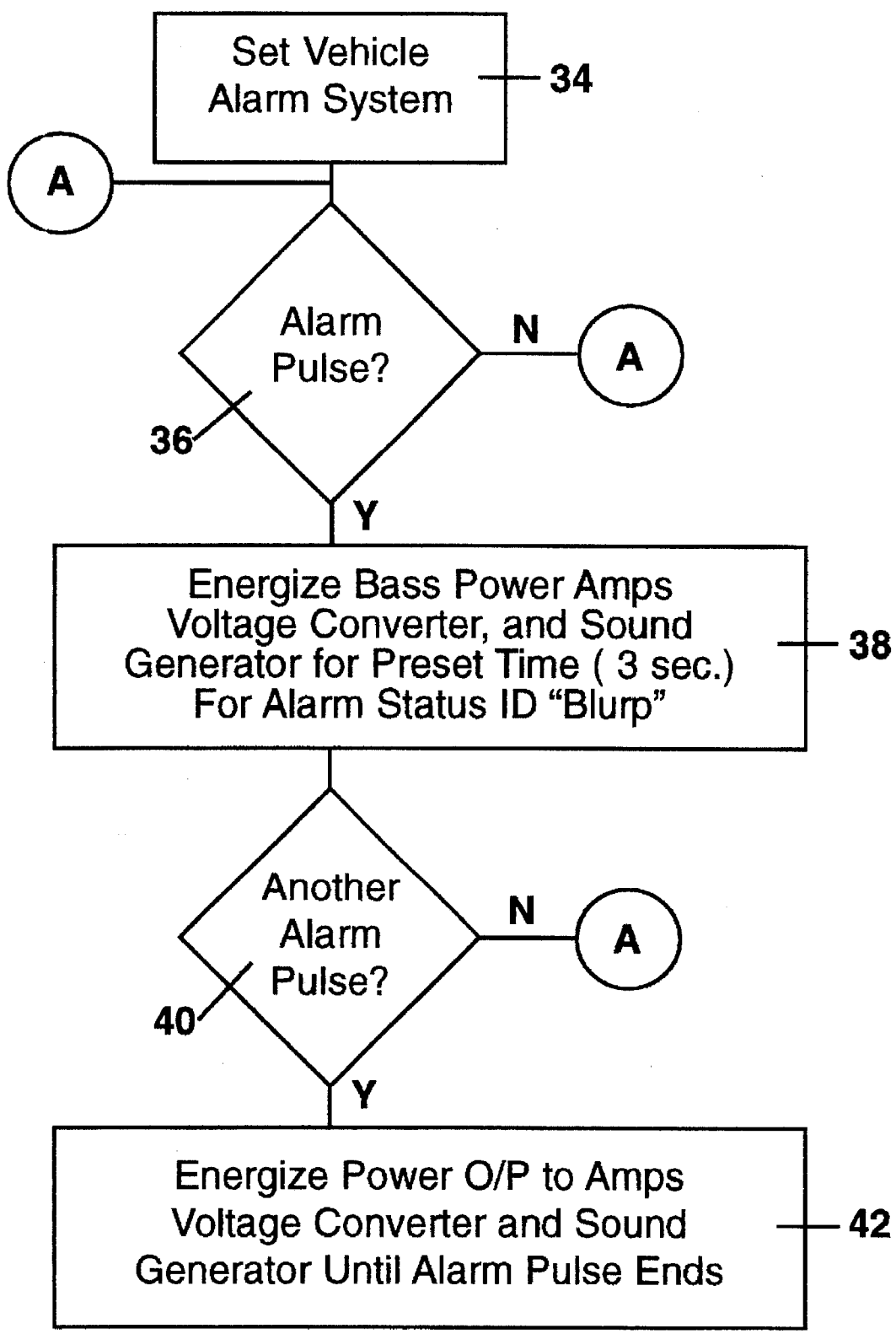
FIG. 3 is a functional flow chart illustrating the operation of the preferred embodiment of the present invention.

Operation of the preferred embodiment is shown in FIG. 3. The interface 10 is activated at block 34 when the pulse catcher senses that the alarm has been turned on. Pulse catcher control logic next monitors signals from the alarm at decision block 36 when a signal is detected, pulse catcher 12 briefly energizes the power output connector 18, voltage converter 14 and sound generator 16 at block 38 to indicate that the alarm is active. The pulse catcher 12 next waits at decision block 40 for the arrival of a second alarm signal within a predetermined time period. When a second alarm signal is detected within the prescribed time control will pass to block 42 where the power output connector 18 as well as voltage converter 14 are energized; voltage converter 14 in turn activates sound generator 16 for output through audio output connector 20. If a second alarm signal is not detected within the prescribed time period the system is reset and logical control returns to decision block 36

Figure 2:
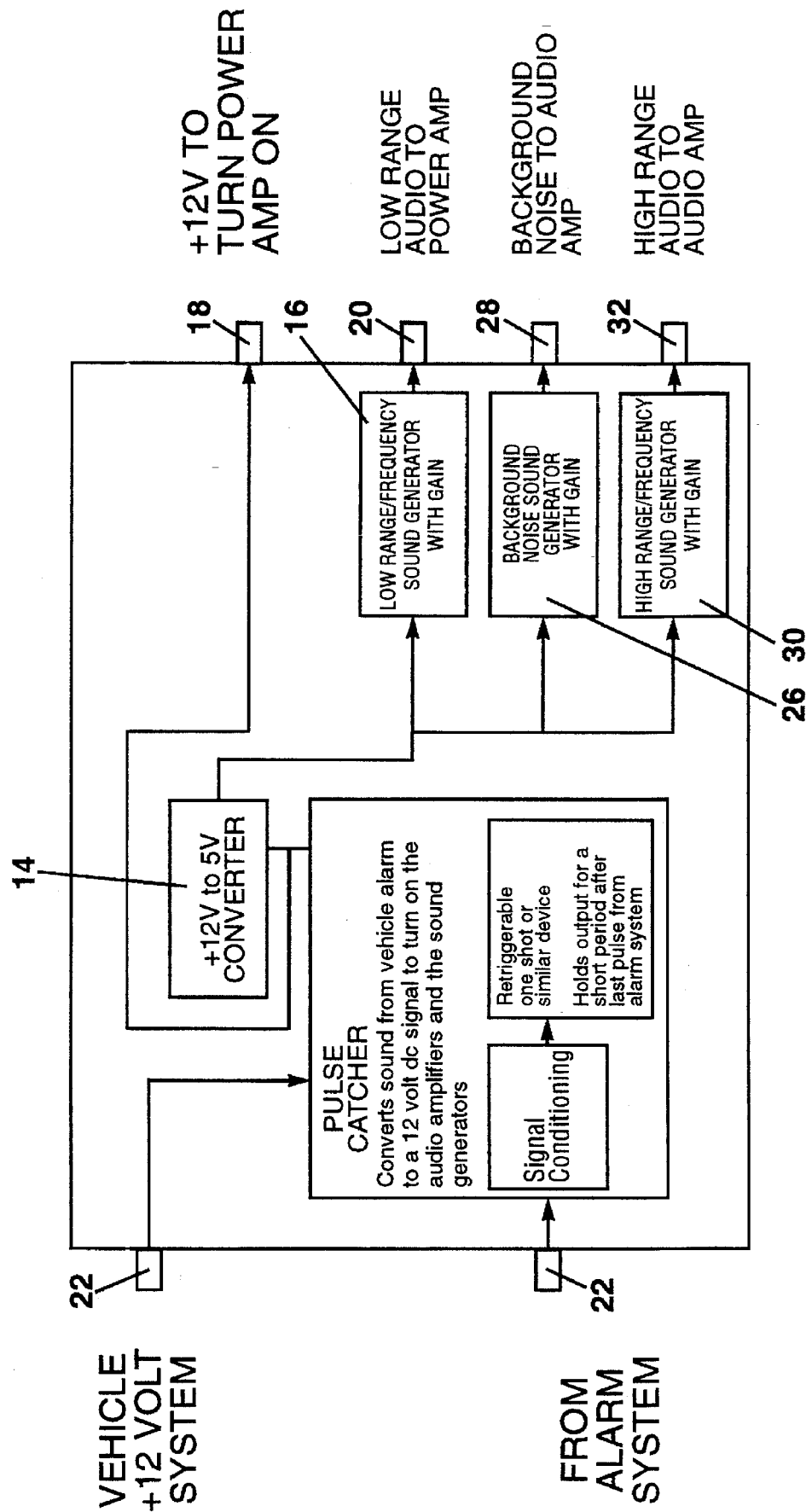
FIG. 2 is a block diagram of an alternate embodiment of the present invention.

An alternate embodiment is shown in FIG. 2 which includes two additional sound generators. Background noise sound generator 26 and background output connector 28 are provided to generate mid-range audio output. The background noises generated can be employed to generate sounds that will serve to scare and or confuse a thief. Examples of sounds that may play on the nervousness of an offender, hopefully frightening him/her into abandoning the attempt, include a police siren, helicopter, voices or barking dogs. High frequency sound generator 30 and high frequency output connector 32 are provided to generate an ear piercing "annoyance signal" to make being in the car extremely uncomfortable. When an extra gain control (not shown) is provided for this function the signal can be set near the threshold of pain. A delay will be provided for this feature to protect the alarm owner's hearing in case of a false alarm.

Figure 4:
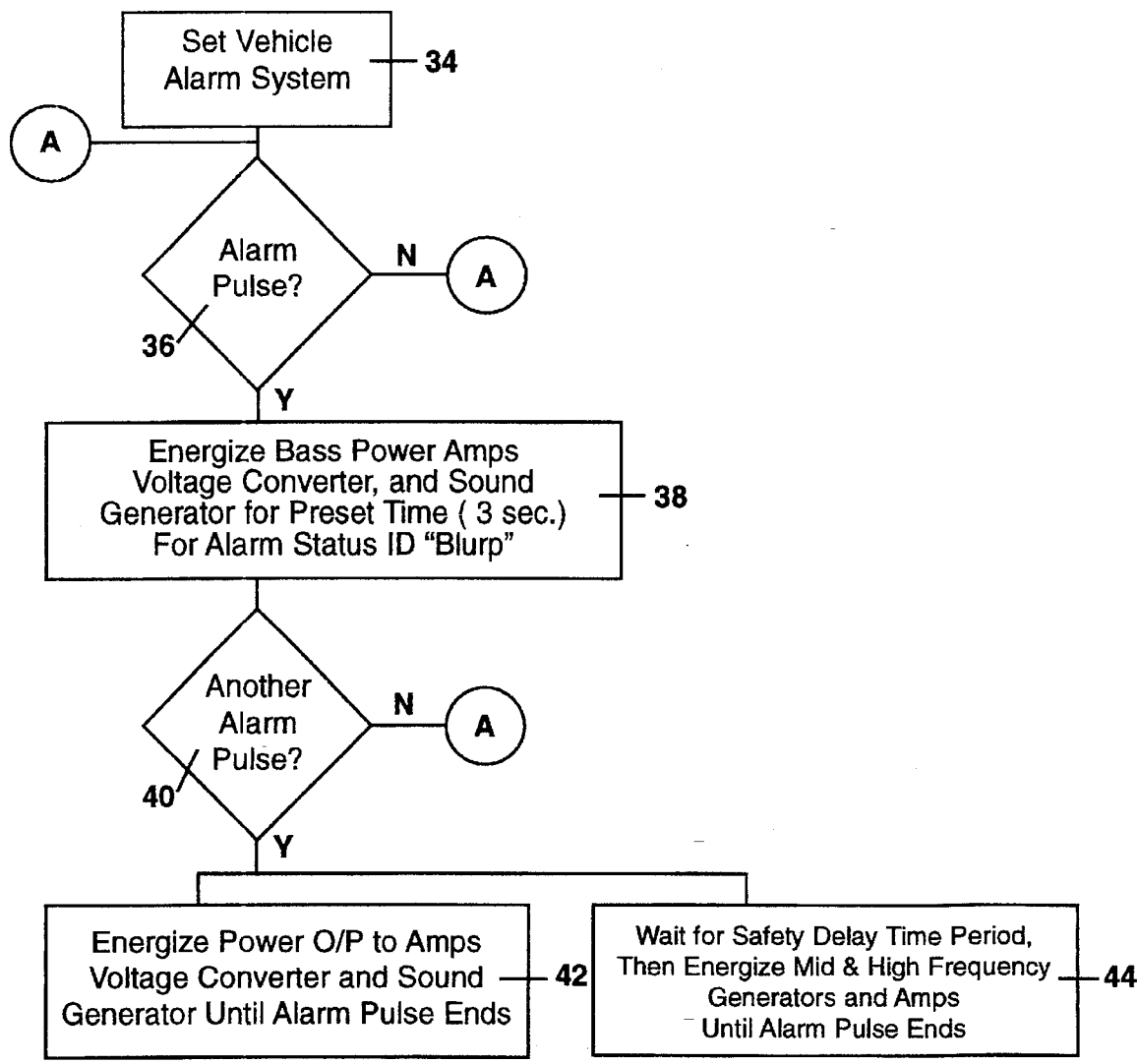
FIG. 4 is a functional flow chart illustrating an alternate embodiment of the present invention.
Figure 5:
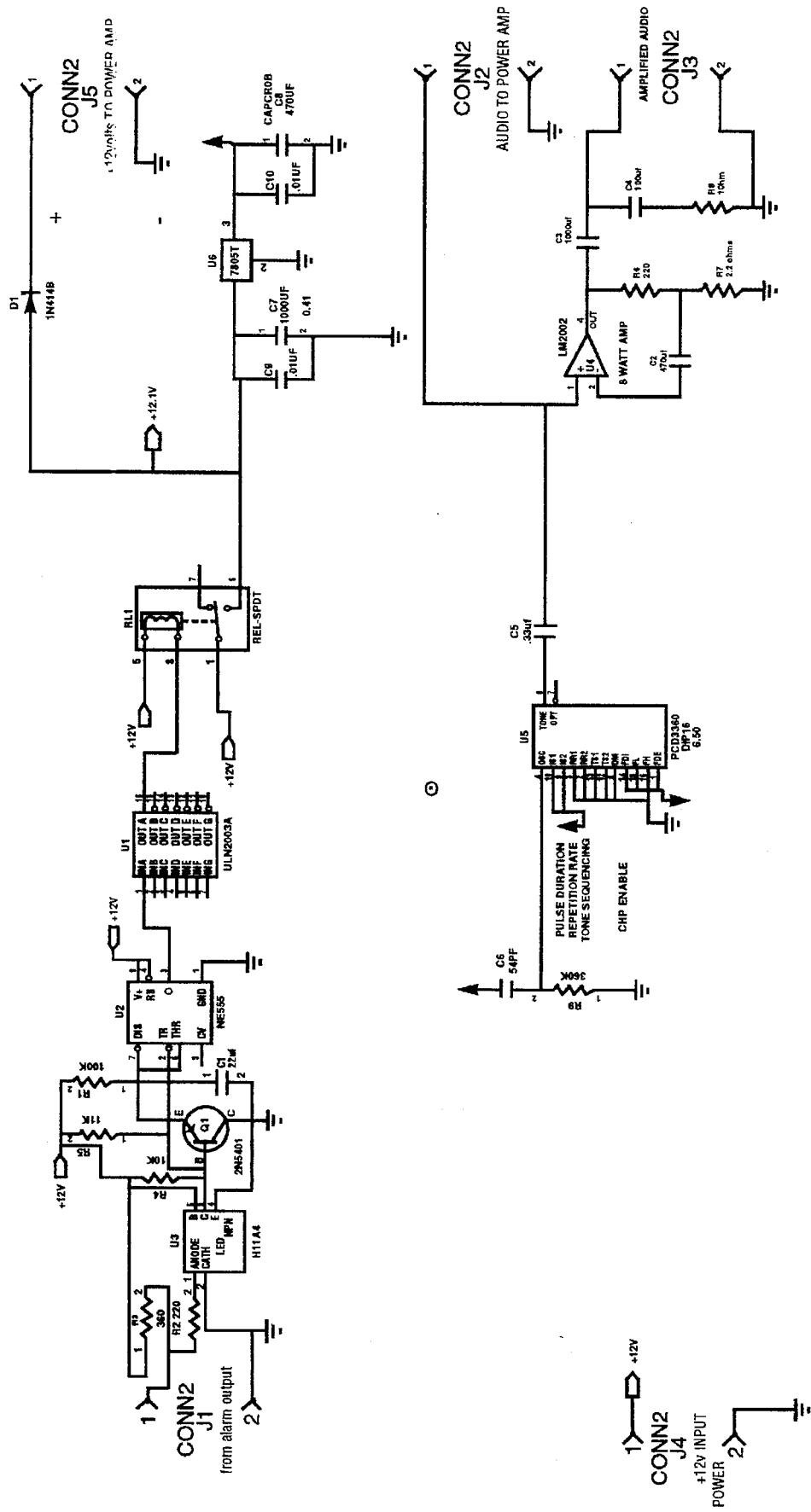
FIG. 5 is a schematic diagram representing the interface unit of FIG. 1.

Operation of the alternate embodiment of FIG. 2 is shown in FIG. 4. This functional flowchart is similar to that of FIG. 3 except at block 44, which indicates that this embodiment will wait a predetermined amount of time (for example, 30 seconds) to allow the alarm owner to deactivate the alarm if it is accidentally activated. In case of a true alarm situation, the safety time delay will pass and then the mid and high frequency sound generators will be activated.

Other embodiments are contemplated which include such features as a slave amplifier, programmable playback digital memory and sampling. A slave amplifier may be required in certain circumstances to prevent any interface "system noise" from being amplified during normal use of the audio system. An output volume control/adjustable gain knob can be provided to allow the alarm owner to adjust output volume and prevent damage to speakers that may otherwise occur. Programmable playback features will allow customization of the interface output so that different systems have a distinct and recognizable signal pattern. Digital memory and sampling will allow further customization of the interface; for example the owner may wish to record a favorite bass line for use in the activation loop, the arm signal and/or the disarm signal or may even wish to add a sample of his/her own voice for playback.

Whereas the present invention has been described in detail with specific reference to particular embodiments thereof, it will be understood that variations and modifications can be effected within the spirit and scope of the present invention as herein before described and as defined in the appended claims.

I claim:

1. Interface apparatus for operatively connecting an external activation source and an audio system, comprising:

pulse catcher means for sensing signals from the external activation source;

power output connector means for providing power to the audio system in response to a signal from said pulse catcher means;

sound generator means for generating low frequency audio signals in response to a signal from said pulse catcher means; and audio output connector means for sending said low frequency audio signals from said sound generator means to the audio system.

2. Apparatus of claim 1, further comprising an adjustable gain connected between said sound generator means and said audio output connector.

3. Alarm interface apparatus for sending output to an external sub-woofer audio system to audibly indicate an alarm condition, comprising:

alarm connector means for connecting said alarm interface apparatus to an external alarm system;

pulse catcher means for intercepting an alarm condition signal from said alarm connector means and generating an output signal;

a low frequency sound generator means for generating an audio signal suitable for driving a sub-woofer speaker of the external sub-woofer audio system;

a power output connector means for powering the external sub-woofer audio system;

an audio output connector means attached to said sound generator means, for sending said audio signal to the external sub-woofer audio system; and control means for activating said power output connector and said low frequency sound generator means in response to said output signal from said pulse catcher means.

4. Alarm interface apparatus of claim 3, wherein said pulse catcher means further includes, at least, counter means to count the number of alarm condition signals within a predetermined period of time to verify that a true alarm condition exists.

5. Alarm interface apparatus of claim 3, further comprising a power amplifier connected between said sound generator means and said audio output connector means.

6. Alarm interface apparatus of claim 3, further comprising an adjustable gain connected between said sound generator means and said audio output connector means.

7. Interface apparatus for operatively connecting an external activation source and a sub-woofer audio system, comprising:

pulse catcher means for sensing signals from the external activation source;

power output connector means for providing power to the audio system;

sound generator means for generating low frequency audio signals;

audio output connector means for sending said low frequency audio signals from said sound generator means to the audio system; and control means for activating said power output connector means and said sound generator means in response to signals from said pulse catcher means.

8. Apparatus of claim 7, wherein said pulse catcher means further includes, at least, counter means to count the number of activation signals within a predetermined period of time.

9. Apparatus of claim 7, further comprising a power amplifier connected between said sound generator and said audio output connector.

* * * * *